(12) United States Patent
Yoon et al.

(10) Patent No.: US 11,005,092 B2
(45) Date of Patent: May 11, 2021

(54) 3D PATTERN CUTTING MACHINE FOR LITHIUM METAL ELECTRODE

(71) Applicant: LG CHEM, LTD., Seoul (KR)

(72) Inventors: Jong Keon Yoon, Daejeon (KR); Hoe Jin Hah, Daejeon (KR); Kyung Hwa Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 155 days.

(21) Appl. No.: 16/346,948

(22) PCT Filed: Jun. 29, 2018

(86) PCT No.: PCT/KR2018/007373
§ 371 (c)(1),
(2) Date: May 2, 2019

(87) PCT Pub. No.: WO2019/013477
PCT Pub. Date: Jan. 17, 2019

(65) Prior Publication Data
US 2020/0058931 A1   Feb. 20, 2020

(30) Foreign Application Priority Data

Jul. 10, 2017 (KR) .................. 10-2017-0086896

(51) Int. Cl.
*H01M 4/1395* (2010.01)
*B21D 22/04* (2006.01)
(Continued)

(52) U.S. Cl.
CPC .......... *H01M 4/1395* (2013.01); *B21D 22/04* (2013.01); *B21D 28/14* (2013.01); *B26F 1/44* (2013.01);
(Continued)

(58) Field of Classification Search
CPC .. H01M 10/0404; H01M 10/04; B21D 22/04; B26F 1/38–46
See application file for complete search history.

(56) References Cited

U.S. PATENT DOCUMENTS

| 7,704,425 B2* | 4/2010 | Heidari | B82Y 10/00 264/220 |
| 2004/0058234 A1* | 3/2004 | Slezak | H01M 4/75 429/164 |

(Continued)

FOREIGN PATENT DOCUMENTS

| CN | 105304856 A | 2/2016 |
| CN | 104668331 B | 11/2016 |

(Continued)

OTHER PUBLICATIONS

Machine Translation of JP2003001595A (Dec. 1, 2020) (Year: 2020).*

(Continued)

*Primary Examiner* — Matthew J Merkling
(74) *Attorney, Agent, or Firm* — Birch, Stewart, Kolasch & Birch, LLP

(57) ABSTRACT

A 3-dimensional (3D) pattern puncher for punching a lithium metal electrode to provide one or more unit electrodes is provided. The 3D pattern puncher includes a mold punch configured to move up and down, the mold punch corresponding to a size of the unit electrode; a die corresponding to the mold punch; a mold blade disposed at an edge of the mold punch and configured to punch the lithium metal electrode to provide the one or more unit electrodes; and a 3D pattern positioned at an inner portion of the mold punch where the mold blade is not disposed.

8 Claims, 3 Drawing Sheets

(51) Int. Cl.
*B21D 28/14* (2006.01)
*B26F 1/44* (2006.01)
*H01M 4/04* (2006.01)
*H01M 4/38* (2006.01)
*H01M 10/0525* (2010.01)
*H01M 4/02* (2006.01)

(52) U.S. Cl.
CPC ............. *H01M 4/04* (2013.01); *H01M 4/382* (2013.01); *H01M 10/0525* (2013.01); *H01M 2004/021* (2013.01)

(56) References Cited

U.S. PATENT DOCUMENTS

| | | | |
|---|---|---|---|
| 2004/0173072 A1* | 9/2004 | Ishii | H01M 4/8605 83/100 |
| 2006/0110661 A1 | 5/2006 | Lee et al. | |
| 2008/0070112 A1 | 3/2008 | Kogetsu et al. | |
| 2008/0248386 A1* | 10/2008 | Obrovac | H01M 4/134 429/209 |
| 2008/0302255 A1 | 12/2008 | Koivukunnas | |
| 2009/0075142 A1* | 3/2009 | Taylor | H01M 4/8605 429/424 |
| 2012/0003572 A1* | 1/2012 | Matsumura | H01M 4/881 429/535 |
| 2013/0014625 A1 | 1/2013 | Yotsumoto et al. | |
| 2013/0019732 A1 | 1/2013 | Yotsumoto | |
| 2013/0295453 A1* | 11/2013 | Ishikawa | H01M 4/043 429/211 |
| 2014/0099538 A1 | 4/2014 | Johnson et al. | |
| 2014/0197801 A1* | 7/2014 | Nuzzo | H01M 4/366 320/137 |
| 2020/0014017 A1* | 1/2020 | Katayama | H01M 8/0271 |
| 2020/0156276 A1* | 5/2020 | Yamamoto | B26D 7/0683 |

FOREIGN PATENT DOCUMENTS

| | | |
|---|---|---|
| CN | 105345889 B | 11/2017 |
| JP | 55-91622 A | 7/1980 |
| JP | 7-89484 B2 | 9/1995 |
| JP | 7-272726 A | 10/1995 |
| JP | 3168783 B2 | 5/2001 |
| JP | 2002-237560 A | 8/2002 |
| JP | 2003-1595 A | 1/2003 |
| JP | 2006-156351 A | 6/2006 |
| JP | 4844710 B2 | 12/2011 |
| JP | 2012-227123 A | 11/2012 |
| JP | 2014-175155 A | 9/2014 |
| JP | 2015-138619 A | 7/2015 |
| JP | 2015-534242 A | 11/2015 |
| KR | 10-2008-0025023 A | 3/2008 |
| KR | 10-2009-0118588 A | 11/2009 |
| KR | 10-1064821 B1 | 9/2011 |
| KR | 10-2011-0122861 A | 11/2011 |
| KR | 10-2015-0093874 A | 8/2015 |
| KR | 10-2015-0102294 A | 9/2015 |
| KR | 10-1558538 B1 | 10/2015 |
| KR | 10-2017-0014216 A | 2/2017 |
| KR | 10-1737790 B1 | 5/2017 |
| WO | WO 2006/075054 A1 | 7/2006 |
| WO | WO 2011/037285 A1 | 3/2011 |

OTHER PUBLICATIONS

International Search Report (PCT/ISA/210) issued in PCT/KR2018/007373, dated Feb. 21, 2019.
Ryou et al., "Mechanical Surface Modification of Lithium Metal: Towards Improved Li Metal Anode Performance by Directed Li Plating", Adv. Funct. Mater. 2015, vol. 25, pp. 834-841.
Yang et al., "Accommodating lithium into 3D current collectors with a submicron skeleton towards long-life lithium metal anodes", Nature Communications, 2015, pp. 1-9.
Japanese Office Action dated Aug. 3, 2020 for Application No. 2019-537227 with an English translation.

* cited by examiner

3D PATTERN CUTTING MACHINE FOR LITHIUM METAL ELECTRODE

TECHNICAL FIELD

This application claims the benefit of priority based on Korean Patent Application No. 10-2017-0086896 filed on Jul. 10, 2017, and the entire contents of the Korean patent application are incorporated herein by reference.

The present invention relates to a 3-dimensional (3D) pattern puncher for a lithium metal electrode, and more particularly, to a 3D pattern puncher for a lithium metal electrode, in which a 3D pattern mold of a polymer material is attached to a mold which punches a lithium metal electrode into unit electrodes, or the lithium metal electrode is punched into unit electrodes by making the mold itself as a polymer material having 3D patterns, and at the same time, 3D patterns can be engraved on the surface of the unit electrodes.

BACKGROUND ART

As the price of energy sources increases due to depletion of fossil fuels and the interest in environmental pollution is amplified, the demand for environmentally friendly alternative energy sources becomes an indispensable factor for future life. Especially, the demand for secondary batteries as an energy source is rapidly increasing.

Typically, in terms of the shape of the battery, there is a high demand for a prismatic secondary battery and a pouch-type secondary battery that can be applied to products such as mobile phones with a small thickness. In terms of material, there is a high demand for a lithium ion battery having high energy density, discharge voltage, and output stability, and a lithium ion polymer battery.

Generally, a secondary battery is manufactured as follows. First of all, an active material is applied to the surface of a current collector to form a positive electrode and a negative electrode, and a separator is interposed therebetween to make an electrode assembly. Then the electrode assembly is mounted at the inside of a pouch type case of a cylindrical or rectangular metal can or aluminum laminate sheet, and a liquid electrolyte is injected or impregnated into the electrode assembly to thereby make a secondary battery. Sometimes a solid electrolyte may also be used.

In general, a carbon material such as graphite is used as a negative electrode of a lithium secondary battery, but it may be made of lithium metal. Lithium used as a negative electrode has a low density of 0.54 g/cm$^3$ and a standard reduction potential of −3.045 $V_{SHE}$, which is very low, and thus it is most popular as an electrode material of a high energy density battery. However, there are the following problems in applying the lithium metal to the negative electrode.

Since the polymer electrolyte is chemically very active, the passive film is formed by reaction with the organic electrolyte, and as oxidation (dissolution) and reduction (deposition) reactions of lithium on the lithium metal surface during charging and discharging are repeated unevenly, the formation and growth of the passive film is extremely severe.

As a result, not only the capacity of the battery is reduced during charging and discharging but also as the charging and discharging process is repeated, lithium ions are grown in the form of needles on the surface of the lithium metal to thereby form a dendrite (lithium resin phase), which shortens the life of the battery, resulting in short circuit between the electrodes.

As described above, the lithium metal has a capacity of about 3860 mAh/g per unit weight, but it is difficult to commercialize it due to the continuous reaction with the electrolyte in the battery and the resinous growth of lithium due to its life.

In order to solve this problem, various types of techniques have been developed. Recently, the increase in the surface area due to the formation of the 3D structure has been highlighted. By forming a 3D structure to maximize the surface area of the electrode, the area of contact of the lithium metal with the electrolyte is increased, thereby suppressing the growth of the dendrite.

Generally, a method of engraving a 3D pattern on a lithium metal electrode involves rolling a 3D pattern embossing on a roller. The 3D pattern is engraved on the surface of the lithium metal electrode by letting the roller having the 3D pattern of the shape that it wants to carve to pass over the lithium metal electrode at a constant pressure.

FIG. 1 is a schematic view showing a method of engraving a 3D pattern 2 on a lithium metal electrode 3 using a 3D pattern roller 1 according to a conventional art. The 3D pattern roller 1 is formed of a material having a cube-like pattern 2 on its surface and being harder than lithium metal. When the 3D pattern roller 1 passes over the lithium metal electrode 3 at a constant pressure, a cubic 3D pattern is engraved on the surface of the lithium metal electrode 3 at a depressed angle.

However, in this case, there is a problem that the rollers themselves have to be replaced if desiring to engrave different kinds of patterns. The bigger problem is that the rollers used in the rolling process are generally made of metal because they have to be heavily weighted to maintain a constant pressure, and thus an issue of releasing from lithium metal occurs. Lithium metal is a very fragile metal. Therefore, when rolling with a metal roller, it tends to stick to the roller. If this is repeated, the shape of the 3D pattern is not constantly engraved. To solve this problem, the rollers should be periodically cleaned.

DISCLOSURE

Technical Problem

An object of the present invention is to solve the above-mentioned problems, and it is an object of the present invention to provide a 3D pattern puncher which can easily change 3D patterns when desiring to engrave other types of patterns on the surface of the lithium metal electrode, has a long replacement cycle due to a high releasability from a lithium metal, and has a constant engraved 3D pattern shape.

Another object of the present invention is to provide a method of manufacturing a lithium metal unit electrode using the 3D pattern puncher, and a lithium metal unit electrode manufactured by the method and a secondary battery using the same.

Technical Solution

According to an aspect of the present invention, a 3-dimensional (3D) pattern puncher for punching a lithium metal electrode to provide one or more unit electrodes, the 3D pattern puncher including: a mold punch configured to move up and down, the mold punch corresponding to a size of the unit electrode; a die corresponding to the mold punch;

a mold blade disposed at an edge of the mold punch and configured to punch the lithium metal electrode to provide the one or more unit electrodes; and a 3D pattern positioned at an inner portion of the mold punch where the mold blade is not disposed.

Here, the mold punch may be one of a metal mold and the 3D pattern adhered thereto, the 3D pattern being made of a polymer material, or a mold and the 3D pattern integrally made of a polymer material.

The polymer material may be any one of polycarbonate, polyurethane acrylate, polyethylene terephthalate, polypropylene, polystyrene, and polybutylene terephthalate.

A depth of the 3D pattern may be about 10 µm to about 100 µm.

The 3D pattern may be an embossed shape or an engraved shape.

The 3D pattern may have one of a mesh shape, a lamellar shape, an emboss shape, a linear shape, a circular shape, an elliptical shape, a polygonal shape, and a waveform shape.

The 3D pattern puncher may further include a roller-shaped unwinder for continuously supplying a lithium metal electrode to a side surface of the die before being punched.

According to another aspect of the present invention, a method for manufacturing a lithium metal unit electrode using the 3D pattern puncher, including: positioning the lithium metal unit at the die; pushing the mold punch down and engraving 3D patterns on the lithium metal electrode; and releasing the lithium metal unit electrode by raising the mold punch is provided.

According to further another aspect of the present invention, a lithium metal unit electrode produced by the above method is provided.

According to further another aspect of the present invention, a secondary battery comprising the lithium metal unit electrode is provided.

Advantageous Effects

If the lithium metal unit electrode is produced by the 3D pattern puncher provided in the present invention, the cost and time for 3D pattern replacement and cleaning are reduced, the shape of the 3D pattern is always constantly formed, and the 3D pattern is engraved while the punching process is performed to thereby improve the productivity of the lithium metal electrode.

DETAILED DESCRIPTION OF THE PREFERRED EMBODIMENTS

Hereinafter, the present invention will be described in detail with reference to the accompanying drawings. The present invention is not limited by the following examples. The embodiments according to the present invention can be modified into various other forms, and the scope of the present invention should not be construed as being limited to the embodiments described below. The embodiments of the present invention are provided to more fully describe the present invention to those skilled in the art.

Figure 1:
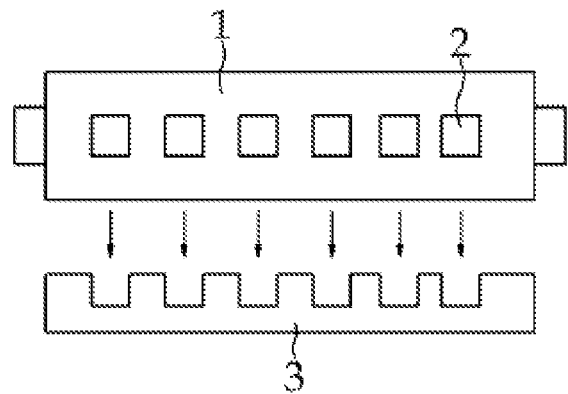
FIG. 1 is a schematic view showing a conventional 3D patterning method.
Figure 2:
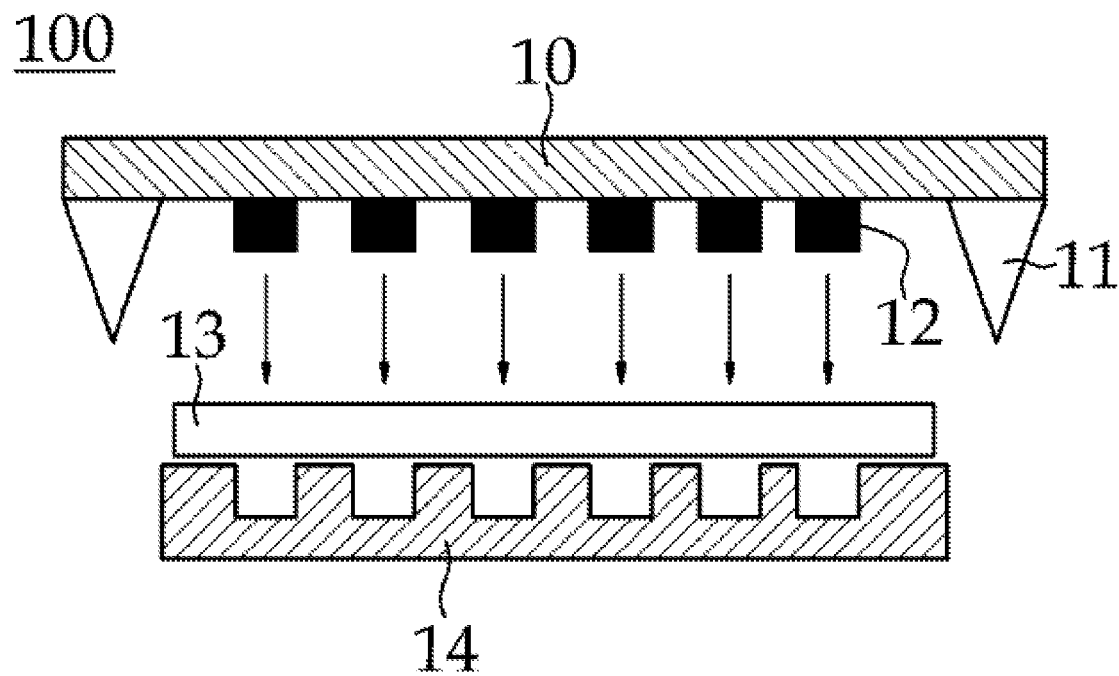
FIG. 2 is a schematic view showing the structure of a 3D pattern puncher according to the present invention.

As shown in FIG. 2, a 3D pattern puncher 100 according to the present invention includes: a mold punch 10 which moves up and down with a mold suited to the size of a unit electrode; a die 14 corresponding to the mold punch 10; a mold blade 11 disposed at an edge of the mold punch 10 to punch a lithium metal electrode 13 to become unit electrodes; and a 3D pattern 12 located on an inner portion of the mold punch 10 contacting the die 14 and formed in a non-bladed portion.

The mold punch 10 shown in FIG. 2 has the mold blade 11 at its edge and the 3D pattern 12 formed inside. The die 14 is formed so as to engage with the mold blade 11 and the 3D pattern 12. The mold blade 11 is shown thick and pointed in FIG. 2 to emphasize the punch function, but actually functions as a thin blade. The lithium metal electrode 13 is positioned on the die 14, and the metal punch 10 is lowered and engaged with the die 14 to punch the lithium metal electrode 13 and simultaneously engrave a 3D pattern on the surface. It is preferable that the lithium metal electrode 13 is actually supplied continuously, and in order to emphasize the punching function, in FIG. 2, an unwinder (not shown) for continuously supplying the lithium metal electrode 13 and a portion where the lithium metal electrode 13 is continually supplied are not shown.

In the present invention, the object of the punching is the lithium metal electrode 13 having a capacity per unit weight of about 3860 mAh/g, which is very useful as a negative electrode. However, the pure lithium metal has a density of 0.54 g/cm$^3$ and has a problem of continuously reacting with the electrolyte to form dendrites. However, because of its soft nature, plastic processing and punching are easy, and it is easy to engrave 3D patterns on the surface.

The size of the lithium metal unit electrode may vary depending on the size and capacity of the battery to be manufactured. It is also possible to bend the electrode at a certain level because of its easy processing property. Therefore, it can be used for stacked, folded, and stacked-folded type electrode assemblies.

The mold punch 10 punches the lithium metal electrode 13 to become unit electrodes through a vertical movement. The vertical movement may be performed by a crank type, a gravity type, a hydraulic type, etc., and is not limited as long as it can apply a constant pressure while moving up and down. The mold punch 10 cuts the lithium metal electrode 13 into unit electrodes by applying a constant pressure to the lithium metal electrode 13 while descending from the top to the bottom with the lithium metal electrode 13 positioned on the die 14.

The die 14 corresponding to the mold punch 10 has a size to engage with the mold punch 10 so that the mold punch 10 is lowered and engaged to punch the lithium metal electrode 13. An unwinder may be further provided on the side of the die 14. As such, the lithium metal electrode 13 is continually supplied, the lithium metal electrode 13 is punched into unit electrodes in the mold punch 10 and the die 14, then if the mold punch goes upward, as the lithium metal electrode 13 before being punched pushes the punched electrode and is continually supplied, the lithium metal unit electrodes are continually produced. It is preferable that the die 14 is made of a metal material having a strength greater than that of the mold punch 10 since the impact of the mold punch 10 should be absorbed for a long time.

The mold blade 11, which cuts the lithium metal electrode 13 into unit electrodes, is located at the edge of the mold punch 10. The mold blade 11 may be attached to the punch with a separate structure, but it is more preferable that the mold blade 11 is integrally formed with the mold, because the structure is simplified and it is advantageous in maintenance. The mold punch 10 has a size suitable for the lithium metal unit electrode and the mold blade 11 is positioned at the edge thereof to cut the lithium metal electrode 13 into unit electrode sizes. If the supplied lithium metal electrode 13 is supplied in the longitudinal direction with the same width as the unit electrode, the metal blade 11 is positioned only in the width direction, and if the lithium metal electrode 13 has the same length as the unit electrode and is supplied in the width direction, the mold blade 11 is positioned only in the longitudinal direction. If the lithium metal electrode 13 is supplied in a direction inconsistent with the size of the unit electrode in any direction, the mold blade 11 should be positioned on all sides of the mold punch 10. In consideration of the productivity, it is preferable that the supplied lithium metal electrode 13 is aligned with the unit electrode in the length or width direction and the number of the mold blades 11 is reduced.

A 3D pattern 12 is formed on the inner side of the mold punch 10 in contact with the lithium metal electrode 13. When the lithium metal electrode 13 is placed on the die and is punched into unit electrodes as the mold punch 10 descends and is engaged with the die 14, the 3D pattern 12 formed at the inner side comes into contact with the lithium metal electrode 13 to engrave the 3D pattern on the surface of the lithium metal electrode 13.

The 3D pattern 12 may be embossed or engraved, and if the 3D pattern 12 engraved inside the punch mold punch 10 is embossed, an engraved 3D pattern is engraved on the lithium metal electrode 13, and if the 3D pattern 12 engraved inside the punch mold punch 10 is engraved, embossed 3D patterns are engraved on the lithium metal electrode 13. The 3D pattern 12 has a shape of any one of a mesh, a lamellar, an emboss, a linear, a circle, an ellipse, a polygon, and a waveform, and this may be variously selected according to the usage of the battery to be manufactured using the lithium metal electrode and the degree of dendrite growth inhibition to be given to the lithium metal electrode 13.

The depth of the 3D pattern 12 is preferably 10 to 100 μm. The 3D pattern of the same depth is also formed in the lithium metal electrode 13 by the depth of the 3D pattern 12 of the mold punch 10, and the height of the lithium metal electrode 13 is usually within several hundreds of micrometers. And if the depth is less than 10 μm, the effect of suppressing the growth of dendrite is reduced. If the depth is more than 100 μm, the processability is deteriorated and it is difficult to continually engrave a constant pattern.

The mold punch 10 of the present invention is either a mold in which a 3D pattern 12 mold of a polymer material is attached to a metal mold or a mold in which the mold is integrally made of a polymer material. In the case of a metal mold, the mold blade 11 is also integrally made of a metal material, and the 3D pattern 12 of a polymer material is attached on the inside of the mold. When the mold is integrally made of a polymer material, the mold blade 11 and the 3D pattern 12 are integrally made of a polymer material.

In the prior art, the electrode is rolled using the roller 1 with the 3D pattern engraved. In this case, there are two problems. One is that when the pattern to be engraved is to be replaced, the roller itself needs to be replaced, which is not desirable in terms of cost and time, which leads to poor productivity. Another problem is that the rollers used in the rolling process usually use a metal which is heavy in order to have a certain pressure, which leads to a poor releasing property with lithium metal. When the lithium metal electrode 3 is rolled with the roller, the lithium metal sticks to the roller due to its poor releasing property. And when the lithium metal sticks to the lithium metal continuously during the rolling process, the shape of the later engraved 3D pattern becomes different from the original shape. Therefore, in order to engrave a certain type of 3D pattern, it is necessary to clean the lithium metal sticking to the roller from time to time, which leads to an increase in production cost and time.

The mold punch 10 of the present invention uses a 3D pattern 12 of a polymer material attached to a metal mold so that only the 3D pattern 12 mold needs to be replaced when the 3D pattern 12 is to be changed, and thus the above problem can be solved. In the prior art, it takes a lot of time and cost because the entire roller needs to be replaced. However, the replacement of the 3D pattern 12 according to the present invention requires only a replacement of the 3D pattern 12 mold made of a polymer material, and thus the costs and time can be saved. Even if the entire mold is made of a polymer material, the mold itself can be replaced with a mold having another 3D pattern (12), so that replacement of the entire metal roller is simpler and the cost is reduced.

When the mold of the 3D pattern 12 made of the polymer material is attached to the mold or the mold itself is made of a polymer material, the releasability with the lithium metal electrode 13 is improved as compared with the prior art. As the polymer material, polycarbonate, polyurethane acrylate, polyethylene terephthalate, polypropylene, polystyrene, polybutylene terephthalate and the like can be used. Particularly, since polyurethane acrylate and polycarbonate have appropriate hardness and releasability, they may be preferred in that a precise pattern can be engraved on a metal and at the same time they can be reused without being broken even if the process of pressing on the lithium metal is repeated several times.

Even when the entire mold is made of a polymer material and the mold blade 11 is also made of a polymer material, the lithium metal has a soft nature and can be sufficiently punched because of its good processability. Unlike the prior art, the 3D pattern 12 mold having improved releasability does not need to be cleaned frequently since the lithium metal does not adhere well after the 3D pattern is engraved, and the 3D pattern engraved on the lithium metal electrode 13 can be more uniformly engraved.

The method of forming the 3D pattern on the mold of the polymer material attached to the mold punch of the present invention is not particularly limited and any known method such as photolithography or soft lithography can be used. Examples of the soft lithography method include fine contact printing, decal transfer microlithography, photo-bonding mask method, replica molding, capillary-fine molding method, and the like. In the present invention, The replica molding method is suitable because the process is relatively simple, it is convenient for mass copying of a multidimensional structure and is suitable for mass production at a low cost.

Figure 4:
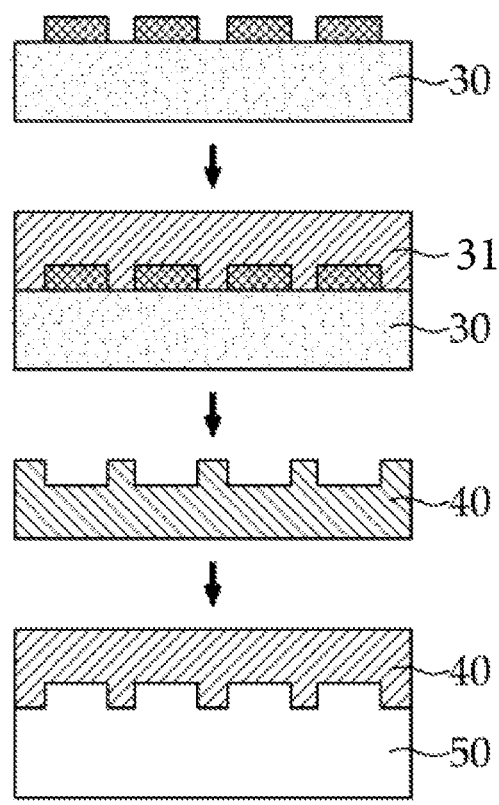
FIG. 4 is a schematic view showing a process of fabricating a 3D pattern mold of a polymer material and transferring the 3D pattern mold to lithium metal according to the present invention.

Replica molding is a replica of original information using a stamp made of flexible polymer. Referring to FIG. 4, in order to manufacture the 3D pattern mold of the present invention, a silicon master mold 30 having a desired 3D pattern is prepared, and a polymer precursor 31 such as polyurethane acrylate is poured on the silicon master mold. The polymer is then cured to form a polyurethane acrylate mold 40.

The thus formed polyurethane acrylate mold 40 is attached to the mold punch, and the lithium metal 50 is placed on the die. When the mold punch is pushed down to be lowered from the top down, the 3D pattern is transferred to the lithium metal.

In order to prevent contamination due to moisture reactivity of the lithium metal and to give more reliable releasability, a hydrophobic material, etc. may be thinly (several nm) coated on a polyurethane acrylate mold by using a spin coating scheme.

The present invention also provides a method of manufacturing the lithium metal unit electrode 21 using the 3D pattern puncher 100. The method includes positioning the lithium metal electrode 13 on the die 14; engraving the 3D pattern on the surface of the lithium metal electrode 13 while pushing down the mold punch 10 from the top to the bottom; and releasing the lithium metal unit electrode 21 from the mold by lifting the mold punch 10.

Figure 3:
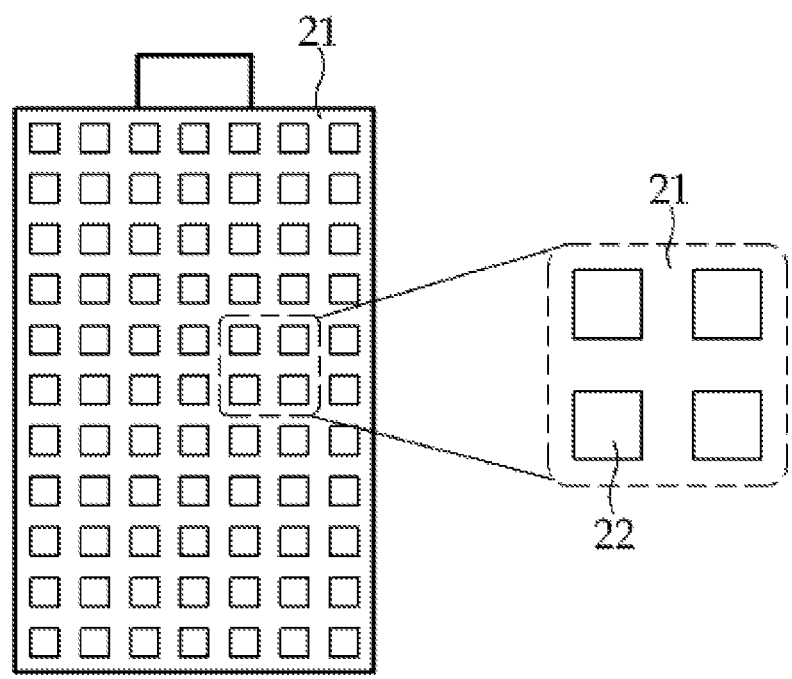
FIG. 3 is a schematic view showing a lithium metal unit electrode according to the present invention.

The present invention is also characterized in providing a lithium metal unit electrode 21 manufactured by the above manufacturing method and a secondary battery including the unit electrode. FIG. 3 schematically shows a lithium metal unit electrode 21 according to the present invention, and shows a square 3D pattern 22 in an enlarged view.

Since the lithium metal unit electrode 21 manufactured according to the above method is more uniformly engraved with the 3D pattern, the generation of dendrite on the electrode surface becomes more uniform than when the same size and shape are formed by the conventional art. When the generation of dendrite is made uniform, the lifetime and safety of the electrode are improved.

The secondary battery using the electrode improves the lifetime and safety of the electrode, thereby improving battery life and cycle characteristics.

Hereinafter, the present invention will be described in more detail through the examples below. However, the following examples are intended to illustrate the present invention and the scope of the present invention is not limited by these examples.

Example 1

A metal mold punch having a 3D pattern mold having a cubic 3D pattern of a size of 20 μm×20 μm×20 μm (width×breadth×depth) was prepared. The material of the 3D pattern mold was polyurethane acrylate. A lithium metal electrode having a thickness of 100 μm was placed on the die. While pushing down the punching mold from the top down, a 3D pattern was engraved on the surface of the lithium metal electrode and punched out. The punched lithium metal unit electrode was released from the mold, and the mold punch was moved up and down while continuously supplying the lithium metal electrode through the roller-type unwinder on the side of the die, thereby preparing 10 lithium metal unit electrodes.

Example 2

A lithium metal unit electrode was prepared in the same manner as in Example 1 except that a 3D pattern mold having a semi-spherical 3D pattern with a diameter of 20 μm was attached.

Example 3

The lithium metal unit electrode has been manufactured in the same manner as Example 1 except that the punch mold and 3D pattern integrally use a mold made of polyurethane acrylate.

Example 4

The lithium metal unit electrode has been manufactured in the same manner as Example 2 except that the punch mold and 3D pattern integrally use a mold made of polyurethane acrylate.

Comparative Example 1

A metal roller having a cubic 3D pattern with a size of 20 μm×20 μm×20 μm (width×breadth×depth) was prepared. A lithium metal electrode having a thickness of 100 μm was rolled with the roller and a 3D pattern was formed on the surface. A lithium metal electrode having a 3D pattern was cut to a predetermined size to prepare 10 lithium metal unit electrodes.

Comparative Example 2

A lithium metal unit electrode was prepared in the same manner as in Comparative Example 1 except that a roller having a hemispherical 3D pattern having a diameter of 20 μm was used.

The lithium metal unit electrodes manufactured in the above embodiments and comparative examples are numbered in the order of manufacturing and the surface of the electrode is observed to show a certain degree of 3D pattern on Table 1. If the square or circular shape of the cross section of the 3D pattern is all correctly etched, and if the depth is constant, it is indicated by O, and if there is any distortion or non-constant depth of the square or circle, it is indicated by X. Also, when the pattern was accurately engraved but the outer cross-section of the punch electrode was not cut smoothly, it was marked separately as Δ beside O and X.

TABLE 1

| Unit electrode no. | Example 1 | Example 2 | Example 3 | Example 4 | Comparative example 1 | Comparative example 2 |
|---|---|---|---|---|---|---|
| 1 | O | O | O | O | O | O |
| 2 | O | O | O | O | O | O |
| 3 | O | O | O | O | O | O |
| 4 | O | O | O | O | O | O |
| 5 | O | O | O | O | O | O |
| 6 | O | O | O | O | X | O |
| 7 | O | O | O | O | X | O |
| 8 | O | O | O | O | X | X |
| 9 | O | O, Δ | O | O | X | X |
| 10 | O, Δ | O, Δ | O | O | X | X |

According to Table 1, according to the embodiments of the present invention, there is no deformation of the engraved 3D pattern while engraving a 3D pattern continuously, whereas in the comparative examples, deformation of the engraved 3D pattern occurs when the 3D pattern is continuously engraved.

While the present invention has been particularly shown and described with reference to exemplary embodiments thereof, it is to be understood that the invention is not limited to the disclosed exemplary embodiments, and various modifications and variations are possible within the scope of the claims.

DESCRIPTION OF SYMBOLS

| | |
|---|---|
| 1: 3D pattern roller | 2: 3D pattern |
| 3: lithium metal electrode | |
| 100: 3D pattern puncher | |
| 10: mold punch | 11: mold blade |
| 12: 3D pattern | 13: lithium metal electrode |
| 14: die | |
| 21: lithium metal unit electrode | |
| 22: 3D pattern | |
| 30: silicon master mold | 31: polymer precursor |
| 40: polymer mold (soft mold) | 50: lithium metal |

The invention claimed is:

1. A 3-dimensional (3D) pattern puncher for punching a lithium metal electrode to provide one or more unit electrodes, the 3D pattern puncher comprising:
a mold punch configured to move up and down, the mold punch corresponding to a size of the unit electrode;
a die corresponding to the mold punch;
a mold blade disposed at an edge of the mold punch and configured to punch the lithium metal electrode to provide the one or more unit electrodes; and
a 3D pattern positioned at an inner portion of the mold punch where the mold blade is not disposed,
wherein the mold punch is one of a metal mold and the 3D pattern adhered thereto, the 3D pattern being made of a polymer material, or a mold and the 3D pattern integrally made of a polymer material.

2. The 3D pattern puncher of claim 1, wherein the polymer material is any one of polycarbonate, polyurethane acrylate, polyethylene terephthalate, polypropylene, polystyrene, and polybutylene terephthalate.

3. The 3D pattern puncher of claim 1, wherein a depth of the 3D pattern is about 10 μm to about 100 μm.

4. The 3D pattern puncher of claim 1, wherein the 3D pattern is formed by one of embossing or engraving.

5. The 3D pattern puncher of claim 1, wherein the 3D pattern has one of a mesh shape, a lamellar shape, an emboss shape, a linear shape, a circular shape, an elliptical shape, a polygonal shape, and a waveform shape.

6. The 3D pattern puncher of claim 1, further comprising a roller-shaped unwinder for continuously supplying a lithium metal electrode to a side surface of the die before being punched.

7. A method for manufacturing a lithium metal unit electrode using the 3D pattern puncher according to claim 1, the method comprising:
positioning the lithium metal electrode at the die;
pushing the mold punch down and engraving 3D patterns on the lithium metal electrode; and
releasing the lithium metal unit electrode by raising the mold punch.

8. The 3D pattern puncher of claim 1, wherein, prior to the 3D pattern contacting the unit electrode, a height of the blade from the mold punch is greater that a height of the 3D pattern from the mold punch.

* * * * *